United States Patent
Iidani et al.

(10) Patent No.: US 8,003,261 B2
(45) Date of Patent: Aug. 23, 2011

(54) POLYOLEFIN MICROPOROUS MEMBRANE

(75) Inventors: Kazuya Iidani, Tokyo (JP); Daisuke Inagaki, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 301 days.

(21) Appl. No.: 12/097,231

(22) PCT Filed: Dec. 11, 2006

(86) PCT No.: PCT/JP2006/324655
§ 371 (c)(1),
(2), (4) Date: Jun. 12, 2008

(87) PCT Pub. No.: WO2007/069560
PCT Pub. Date: Jun. 21, 2007

(65) Prior Publication Data
US 2009/0186280 A1    Jul. 23, 2009

(30) Foreign Application Priority Data

Dec. 15, 2005  (JP) .................................. 2005-362151

(51) Int. Cl.
*H01M 2/16* (2006.01)
(52) U.S. Cl. ...................................................... 429/249
(58) Field of Classification Search .................. 525/240; 264/210; 429/249
See application file for complete search history.

(56) References Cited

U.S. PATENT DOCUMENTS

| | | | | |
|---|---|---|---|---|
| 6,566,012 B1 * | 5/2003 | Kobayashi et al. | ........... | 429/254 |
| 2005/0031943 A1 | 2/2005 | Call | | |
| 2005/0098913 A1 * | 5/2005 | Funaoka et al. | ................. | 264/41 |
| 2007/0015876 A1 * | 1/2007 | Inagaki et al. | ................. | 525/240 |
| 2007/0148538 A1 | 6/2007 | Call | | |

FOREIGN PATENT DOCUMENTS

| | | |
|---|---|---|
| JP | 11-106534 | 4/1999 |
| JP | 2000-17100 | 1/2000 |
| JP | 2000-248088 | 9/2000 |
| JP | 3113287 | 9/2000 |
| JP | 2001-81221 | 3/2001 |
| JP | 2001-229907 | 8/2001 |
| JP | 2002-284918 | 10/2002 |
| JP | 2003-3007 | 1/2003 |
| JP | 2003-3008 | 1/2003 |
| JP | 2003-103624 | 4/2003 |
| JP | 2003-103625 | 4/2003 |
| JP | 2003-103626 | 4/2003 |
| JP | 2003-105121 | 4/2003 |
| JP | 2003-105122 | 4/2003 |
| JP | 2005-56851 | 3/2005 |
| JP | 3681720 | 5/2005 |
| JP | 2005-343958 | 12/2005 |
| TW | 1230173 | 12/1993 |
| WO | WO2005/040258 | * 5/2005 |

* cited by examiner

*Primary Examiner* — Christina Johnson
*Assistant Examiner* — Larry Thrower
(74) *Attorney, Agent, or Firm* — Finnegan, Henderson, Farabow, Garrett & Dunner, L.L.P.

(57) ABSTRACT

The present invention provides a microporous polyolefin film having a thickness of 1 μm (inclusive) to 50 μm (inclusive), a porosity of 30% (inclusive) to 70% (inclusive), a piercing strength of 0.15 N/μm or more in terms of a film thickness of 1 μm, tensile strengths in the length direction (MD tensile strength) and the width direction (TD tensile strength) of 30 MPa or more each, a thermal shrinkage in the width direction (TD thermal shrinkage) of 1% or less at 65° C., and a thermal shrinkage ratio in the length to width direction (MD/TD thermal shrinkage ratio) of more than 2 at 65° C. A process for producing the microporous film and a nonaqueous electrolyte secondary battery using the film are also provided.

6 Claims, No Drawings

POLYOLEFIN MICROPOROUS MEMBRANE

TECHNICAL FIELD

The present invention relates to a microporous film widely used as a separation membrane for separation or selective permeation of substances, or the like, and as a separator material for electrochemical reaction apparatuses such as an alkaline or lithium secondary battery, a fuel cell and a capacitor, or the like. Particularly, the present invention relates to a microporous polyolefin film suitably used as a separator for lithium-ion batteries.

BACKGROUND ART

Microporous polyolefin films are widely used as separation membranes for separation or selective permeation of various substances, separator materials, and the like. For example, the microporous polyolefin films are used as a microfiltration membrane, a separator for fuel cells, a separator for capacitors, a base material for a function membrane in which a functional material is filled in the pores to give rise to a new function, and a separator for batteries. Among these applications, the microporous polyolefin films are particularly suitably used as separators for lithium-ion batteries widely employed in notebook-size personal computers, cellular phones, digital cameras, and the like. The reasons include that the microporous polyolefin films are excellent in the mechanical strength and fusing property.

The fusing property refers to a capability securing the battery safety by a separator melting to close its pores to block the battery reaction when the inside of the battery is overheated by an overcharged state or the like. A lower temperature producing the pore closure is considered to have a higher effect on the safety.

The separator is also required to have at least some measure of strength to be able to withstand the tension during the rolling of the battery or due to the rolling of the separator or to prevent short circuiting due to foreign bodies and the like within the battery or film rupture due to impact.

In addition, for recent lithium-ion secondary batteries, the separator is required to have higher porosity for the purpose of the higher power and higher capacity of the batteries.

The separator is also required to have excellent thermal shrinkage characteristics at high temperatures, which include showing excellent results in a high temperature storage test, a high temperature cycle test, an oven test, and the like in the form of a battery. It is generally considered that the separator is preferably low in thermal shrinkage, particularly in thermal shrinkage in the width direction (direction perpendicular to the machine, hereinafter referred to as "TD"), at high temperature. However, the higher strength, fusing property and higher porosity are typically incompatible with the lower TD thermal shrinkage; it has previously been difficult to provide a separator excellent in all of these characteristics.

The separator is also required to be well contained as a roll form thereof into a square-shaped battery container or the like and closely contacted with electrodes.

However, a separator has not previously been present which is excellent in the mountability as a battery roll and thermal shrinkage characteristics at high temperatures as well as having high strength, excellent fusing property and high porosity.

By way of example, patent documents 1 and 2 propose a microporous film in which a low melting point polyethylene such as copolymer polyethylene and low density polyethylene is used to improve the fusing property. However, these methods tend to improve the fusing property, but there is concern that the methods increase the thermal shrinkage, which results in insufficiency in the mountability of the film as a battery roll and performance of the battery in the oven test.

Patent document 3 proposes a microporous film consisting of different laminated films. The method proposed in the document 3 can be said to cause no shrinkage in the TD direction because drawing is not carried out in the TD direction. However, the film provided in the document 3 is a film obtained through a pore forming process by uniaxial stretching only in the length direction (machine direction, hereinafter referred to as "MD") and represents a microporous film having insufficient TD strength and extreme anisotropy. Thus, there is some apprehension that the film is easily torn in one direction, for example, in a test such as a crush or impact test for the battery.

Patent document 4 proposes a microporous film having high strength and low TD shrinkage, obtained by providing the step of relaxing the shrinkage force in the TD direction. However, it is difficult to sufficiently remove the remaining stress in a slit roll only by the thermal relaxation step. This results in insufficiency in the mountability as a battery roll and performance of the resulting battery in the oven test.

Patent documents 5 to 9 propose obtaining a microporous film having high porosity, high strength and low shrinkage by providing thermal relaxation treatment and heat fixation treatment in a film formation process. However, providing the long-term thermal relaxation/heat fixation treatment step in the film formation process is not only unsubstantial in terms of production but also can be said to result in reduction in the ratio of MD to TD thermal shrinkage and insufficiency in mountability as a battery roll and performance of the battery in the oven test.

As described above, a separator has not previously been present which is excellent in mountability as a battery roll and thermal shrinkage characteristics at high temperatures as well as having high strength, excellent fusing property and high porosity.

Patent Document 1: Japanese Patent No. 3113287
Patent Document 2: Japanese Patent No. 3681720
Patent Document 3: Japanese Patent Laid-Open No. 2005-56851
Patent Document 4: Japanese Patent Laid-Open No. 2001-81221
Patent Document 5: Japanese Patent Laid-Open No. 2003-103624
Patent Document 6: Japanese Patent Laid-Open No. 2003-103625
Patent Document 7: Japanese Patent Laid-Open No. 2003-103626
Patent Document 8: Japanese Patent Laid-Open No. 2003-105121
Patent Document 9: Japanese Patent Laid-Open No. 2003-105122

An object of the present invention is to provide a microporous polyolefin film that can be used as a separator, when set in a battery, providing excellent battery characteristics and a high temperature safety for the battery.

DISCLOSURE OF THE INVENTION

As a result of studies for achieving the above object, the present inventors have found that the thermal shrinkage properties of a microporous film at 65° C. close to the drying temperature of the battery influences the safety performance of a battery at high temperatures in tests such as a high temperature storage test, a high temperature cycle test and an oven test, mountability as a battery roll in a square-shaped battery container or the like, and the adhesion to electrodes.

The inventors have further devised a process which can provide a microporous polyolefin film combining high porosity, high strength, low heat shrinkage and a good balance of heart shrinkages balance. For a conventional separator made to have higher strength and higher porosity, shrinkage force is left without being released in a slit product even after the heat fixation step; the separator released from the shrinkage force when rolling the battery has had the possibility to produce width shrinkage in the TD direction in a battery-drying step, a high temperature storage test, and the like. For that reason, it has been considered to be difficult to simultaneously satisfy the high porosity, high strength and low heat shrinkage. However, as a result of intensive studies, the present inventors have found that even when a microporous polyolefin film with high porosity and high strength is used, a separator with a low heat shrinkage and a good balance of heat shrinkages can be obtained therefrom by providing a separator production process having a specific heat treatment step and optimizing stretching in a directionally well balanced manner. Specifically, the present invention is as follows.

(1) A microporous polyolefin film having a thickness of 1 μm (inclusive) to 50 μm (inclusive), a porosity of 30% (inclusive) to 70% (inclusive), a piercing strength of 0.15 N/μm or more in terms of a film thickness of 1 μm, tensile strengths in the length direction (MD tensile strength) and the width direction (TD tensile strength) of 30 MPa or more each, a thermal shrinkage in the width direction (TD thermal shrinkage) of 1% or less at 65° C., and a thermal shrinkage ratio in the length to width direction (MD/TD thermal shrinkage ratio) of more than 2 at 65° C.

(2) The microporous polyolefin film described in item (1) above, wherein the thermal shrinkage ratio in the length to width direction (MD/TD thermal shrinkage ratio) at 65° C. is more than 2.5.

(3) The microporous polyolefin film described in item (1) or (2) above, wherein the microporous film has an MD thermal shrinkage of more than 5% at 105° C.

(4) The microporous polyolefin film described in any one of items (1) to (3) above, wherein the piercing strength is 3 N or more.

(5) The microporous polyolefin film described in any one of items (1) to (4) above, wherein the tensile elongations in the length direction (MD tensile strength) and the width direction (TD tensile strength) are each 10% (inclusive) to 200% (inclusive); and the total of the MD tensile elongation and TD tensile elongation is 20% (inclusive) to 250% (inclusive).

(6) The microporous polyolefin film described in any one of items (1) to (5) above, wherein the microporous film is obtained from a composition comprising a polyolefin resin and a plasticizer.

(7) A separator for use in batteries using the microporous polyolefin film described in any one of items (1) to (6) above.

(8) A nonaqueous electrolyte secondary battery using the microporous polyolefin film described in any one of items (1) to (6) above.

(9) A process for producing the microporous polyolefin film described in any of items (1) to (6) above, comprising the steps of: melt-kneading and extruding a resin composition comprising at least a polyolefin and a plasticizer to provide a sheet-like material; drawing the sheet-like material to provide a film; extracting the plasticizer from the sheet-like material or film; and performing heat fixation.

The microporous polyolefin film of the present invention has improved porosity, strength and heat shrinkage compared to conventional microporous polyolefin films. Thus, the microporous film of the present invention can provide a battery excellent in battery characteristics and battery safety when used as a battery separator.

BEST MODE FOR CARRYING OUT THE INVENTION

The present invention is described below with reference to a preferred embodiment.

The microporous polyolefin film of the present invention has a thickness of 1 μm or more, preferably 5 μm or more, in view of film strength. The microporous film also has a thickness of 50 μm or less, preferably 30 μm or less, in view of transparency.

The microporous polyolefin film of the present invention has a porosity of 30% or more in view of transparency. The porosity is preferably 40% or more, more preferably 43% or more, particularly preferably 44% or more, in view of battery characteristics such as cycle characteristics being dramatically improved. The microporous film also has a porosity of 70% or less, preferably 60% or less, in view of film strength and voltage resistance.

The microporous polyolefin film of the present invention more preferably has lower air permeability; however, the permeability is preferably 1 sec or more, more preferably 50 sec or more, in view of balance with thickness and porosity. The permeability is also preferably 1,000 sec or less, more preferably 500 sec or less, in view of transparency.

The microporous polyolefin film has a piercing strength of 0.15 N/μm or more, preferably 0.2 N/μm or more, in terms of a film thickness of 1 μm. When the film is used as a battery separator, a lower piercing strength allows sharp edges of the electrode material to pierce the microporous film and facilitates the generation of pinholes and cracks; thus, a higher piercing strength is more preferable. Particularly, since the thinning tends to progress as seen in recent years, the absolute strength is preferably 3 N or more, more preferably 3.2 N or more.

The tensile strength is 30 MPa or more, preferably 40 MPa or more, more preferably 50 MPa, both in the MD and TD directions. A weaker tensile strength deteriorates the battery-rolling property and facilitates short-circuiting in an external impact test of the battery or due to foreign matter or the like in the battery. Particularly, an absolute strength of more than 10 N/cm in the TD direction is favorable for the destruction test.

The MD and TD tensile strengths are each preferably 10 to 200%, more preferably 10 to 150%, particularly preferably 10 to 120%. In addition, the total of the MD tensile elongation and TD tensile elongation is preferably 20 to 250%, more preferably 20 to 230%, particularly preferably 20 to 210%. A microporous film in which the MD and TD tensile elongations are each in the above range is preferable because it not only has a good battery-rolling property but also becomes less susceptible to deformation in the battery impact test and the like.

The microporous polyolefin film has a thermal shrinkage of 1% or less, preferably 0.8% or less, at 65° C. in the TD direction. A thermal shrinkage of more than 1% in the TD direction is not preferable because it makes the microporous film prone to shrink in the width direction in a battery-drying step or in tests such as a high temperature cycle test of the battery and a high temperature storage test of the battery.

The ratio of MD to TD thermal shrinkage (MD/TD thermal shrinkage ratio) at 65° C. is more than 2, preferably more than 2.5, more preferably more than 3. An MD/TD thermal shrinkage ratio of 2 or less makes insufficient the force rolling and tightening a battery in the MD direction. As a result, molding the film into that particularly for a square-shaped battery poses a problem that the whole rolled body is too thick, and makes poor the adhesion between the electrodes and separator, which disadvantageously renders the separator prone to shrink in the TD direction in an oven test and the like. The MD/TD thermal shrinkage ratio at 65° C. is preferably 40 or less in view of some degree of isotropy.

To more effectively exert the above advantages, it is desirable that the MD thermal shrinkage at 105° C. is partly large. Specifically, the shrinkage is preferably more than 5% and preferably less than 20%. It is more preferably 6% or more, particularly preferably 7% or more, most preferably 8% or more. A separator in which the thermal shrinkage is in the above range is preferable because the above-described effect of rolling and tightening a battery is more exerted.

In addition, the MD/TD thermal shrinkage ratio at 105° C. is preferably more than 2. This is because the ratio is effective on the above-described battery thickness and the like even in the hot pressing step or battery-drying step at 80° C. or 90° C., which is a temperature higher than 65° C. The MD/TD thermal shrinkage ratio at 105° C. is preferably 40 or less in view of some degree of isotropy.

A preferable process for producing the microporous film of the present invention will now be described. However, the process is not limited to any extent with respect to the polymer species, solvent species, methods of extrusion, drawing, extraction, pore formation, heat fixation/heat treatment, and the like provided that the resulting microporous film has characteristics satisfying the present invention.

The microporous film of the present invention can be suitably obtained by a production process comprising the steps of: melt-kneading and extruding a resin composition comprising at least a polyolefin and a plasticizer to provide a sheet-like material; drawing the sheet-like material to provide a film; extracting the plasticizer from the sheet-like material or film; and performing heat fixation.

More specifically, the microporous film of the present invention can be suitably obtained by a process comprising the following steps (a) to (e).
(a) A polyolefin such as a polyolefin alone and a polyolefin mixture or a plasticizer, or a polyolefin, a plasticizer and an inorganic agent are melt-kneaded.
(b) The dissolved matter is extruded, molded into a sheet form, and cool-solidified. The plasticizer and inorganic agent are extracted as needed.
(c) The resultant sheet is drawn in at least uniaxial direction.
(d) After drawing, the plasticizer and inorganic agent are extracted as needed.
(e) Subsequently, heat fixation and heat treatment are carried out.

Examples of the polyolefin used in the present invention include a homopolymer of ethylene or propylene, a copolymer thereof with ethylene, propylene, 1-butene, 4-methyl-1-pentene, 1-hexene, 1-octene, norbornene and/or the like, and a mixture of the above polymers. Among these, preferred are polyethylene and a copolymer thereof in view of the performance of a resulting microporous film. Catalysts for polymerization into these polyolefins include a Ziegler-Natta catalyst, a Philips catalyst, and a metallocene catalyst. The polyolefin may be obtained by a single-stage polymerization process or a multi-stage polymerization process.

The composition supplied preferably comprises an ultrahigh molecular weight polyolefin having a viscosity average molecular weight (Mv) of 700,000 or more and a polyolefin having an Mv of 300,000 or less in that it combines low fuse and high short-circuit characteristics. Particularly preferred is a polyolefin comprising an ultrahigh molecular weight polyolefin having an Mv of 1,000,000 or more and a polyolefin having an Mv of 200,000 or less.

The resin composition comprising a polyolefin and a plasticizer may be used by mixing, therein, known additives including a metal soap such as calcium stearate and zinc stearate, an ultraviolet absorber, a light stabilizer, an antistatic agent, an anti-fogging agent and a color pigment.

The resin composition comprising a polyolefin and a plasticizer may also contain an inorganic agent as typified by alumina, titania, or the like. The inorganic agent may be wholly or partly extracted in any of all steps or may be left in a product.

The plasticizer used in the present invention refers to an organic compound which can form a uniform solution with the polyolefin at the boiling point of the compound or lower. Specific examples thereof include decalin, xylene, dioctyl phthalate, dibutyl phthalate, stearyl alcohol, oleyl alcohol, decyl alcohol, nonyl alcohol, diphenyl ether, n-decane, n-dodecane, and paraffin oil. Among these, preferred are paraffin oil and dioctyl phthalate.

The proportion of the plasticizer is not particularly limited; however, it is preferably 20% by weight or more in view of the porosity of a resulting film and preferably 90% by weight or less in view of viscosity. The proportion is more preferably from 50% by weight to 70% by weight.

The extraction solvent used in the present invention is preferably a solvent which is a poor solvent for the polyolefin and a good solvent for the plasticizer and has a boiling point lower than the melting point of the polyolefin. Examples of the extraction solvent include a hydrocarbon such as n-hexane and cyclohexane; a halogenated hydrocarbon such as methylene chloride, 1,1,1-trichloroethane, and fluorocarbons; an alcohol such as ethanol and isopropanol; and a ketone such as acetone and 2-butanone. The extraction solvent used is selected from among these solvents, which are used alone or in a mixture thereof. These extraction solvents may be regenerated by distillation, and again used, after the extraction of the plasticizer.

The weight ratio of the total of the plasticizer and inorganic agent in the whole mixture melt-kneaded is preferably 20 to 95 wt %, more preferably 30 to 80 wt %, in view of film permeability and film-forming property.

An antioxidant is preferably blended in view of preventing heat deterioration during melt kneading and quality degradation due thereto. The concentration of the antioxidant is preferably 0.3 wt % or more, more preferably 0.5 wt % or more, based 2.5 on the total polyolefin weight. It is also preferably 5 wt % or less, more preferably 3 wt % or less. The antioxidant is preferably a phenolic antioxidant as a primary antioxidant; examples thereof include 2,6-di-t-butyl-4-methylphenol, pentaerythrityl-tetrakis-[3-(3,5-di-t-butyl-4-hydroxyphenyl)propionate], and octadecyl-3-(3,5-di-t-butyl-4-hydroxyphenyl)propionate. In addition, a secondary antioxidant can be used in combination therewith; examples thereof include a phosphorus-based antioxidant such as tris(2,4-di-t-butylphenyl)phosphite and tetrakis(2,4-di-t-butylphenyl)-4,4-biphenylene-diphosphonite and a sulfur-based antioxidant such as dilauryl-thio-dipropionate.

A method for melt-kneading and extrusion involves first mixing the whole or part of raw materials in advance using a Henschel mixer, a ribbon blender or a tumbler blender as needed. In the case of a small amount, they may be stirred by hand. The whole raw materials are then melt-kneaded using a screw extruder such as a single screw extruder and a twin screw extruder, a kneader, or a mixer, and extruded through a T-die, a ring die or the like.

The microporous polyolefin film of the present invention can be suitably obtained by mixing a predetermined concentration of an antioxidant in the raw material polymer, followed by purging the mixture with a nitrogen atmosphere and melt-kneading it in a state in which the nitrogen atmosphere is maintained. The temperature during the melt-kneading is preferably 160° C. or higher, more preferably 180° C. or higher. It is also preferably lower than 300° C., more preferably lower than 240° C., still more preferably lower than 230° C.

According to the present invention, the molten material may contain an unmelted inorganic agent which can be extracted in the inorganic agent extraction step. The molten material made uniform by melt-kneading may be allowed to pass through a screen to improve the film quality.

Then, the molten material is preferably subjected to sheet molding. A method for sheet molding involves solidifying the molten material melt-kneaded and extruded by compression cooling. Methods for cooling include a method which involves direct contact with a cooling medium such as cold air and cooling water and a method which involves contact with a roll or pressing machine cooled with a refrigerant. The method involving contact with a roll or pressing machine cooled with a refrigerant is preferable in that it is excellent in the control of thickness. At this time, applying a rolling treatment by bank molding is preferable because it facilitates the achievement of the MD/TD thermal shrinkage ratio of the present invention.

Subsequently, drawing and extraction of the plasticizer and the like are carried out. The drawing and plasticizer extraction, or the drawing, plasticizer extraction, and inorganic agent extraction are not particularly limited for the order, method and frequency thereof. The inorganic agent extraction may not be performed as needed.

Examples of the drawing method used include MD uniaxial drawing using a roll drawing machine, TD uniaxial drawing using a tenter, successive biaxial drawing using a combination of a roll drawing machine and a tenter or of tenters, and simultaneous biaxial drawing using a simultaneous biaxial tenter or inflation molding. The total area draw ratio is preferably 8 times or more, more preferably 15 times or more, most preferably 40 times or more, in view of the uniformity of film thickness. When the simultaneous biaxial drawing is carried out, the MD/TD draw ratio is preferably 1.1 or more, particularly 1.2 or more, because the MD/TD thermal shrinkage ratio of the present invention is easily achieved. In addition, when the successive biaxial drawing is performed, drawing is preferably conducted first in the MD direction and then in the TD direction because the MD/TD thermal shrinkage ratio of the present invention is easily achieved.

In the plasticizer extraction, the plasticizer is extracted from the drawn sheet by immersing the sheet in an extraction solvent or showering it therewith. Then, the sheet is sufficiently dried.

A method for the heat fixation involves performing a relaxation operation at a predetermined relaxation rate in a predetermined temperature atmosphere. The heat fixation can be carried out using a tenter or a roll drawing machine. The relaxation operation refers to a shrinking operation in the MD and/or TD direction of the film. The relaxation rate refers to a value provided by dividing the MD size of the film after the relaxation operation by the MD size of the film before the relaxation operation or a value provided by dividing the TD size of the film after the relaxation operation by the TD size of the film before the relaxation operation, or, in the case of relaxation in both of the MD and TD directions, a value provided by multiplying the MD relaxation rate by the TD relaxation rate. The predetermined temperature is preferably 100° C. or higher in view of thermal shrinkage and preferably lower than 135° C. in view of permeability. The predetermined relaxation rate is preferably 0.9 or less, more preferably 0.8 or less in view of thermal shrinkage. The rate is also preferably 0.6 or more in view of prevention of the generation of wrinkles, porosity, and permeability. The relaxation operation may be performed in both of the MD and TD directions. The relaxation operation only in the either MD or TD direction can reduce the thermal shrinkage not only in the operation direction but also in the direction perpendicular to the operation.

Surface treatment may also be applied such as electron irradiation, plasma exposure, surfactant coating and chemical modification.

A master roll after the above heat fixation is preferably treated at a predetermined temperature, followed by subjecting the master roll to a rollback operation. This step not only releases the remaining stress of the polyolefin in the master roll but also facilitates adjustment to the MD/TD thermal shrinkage ratio of the present invention. The temperature at which the master roll is heat-treated is preferably 35° C. or higher, more preferably 45° C. or higher, particularly preferably 60° C. or higher. It is also preferably 120° C. or lower in view of keeping the transparency.

Subjecting the drawn sheet to annealing using a heating roll after the heat fixation step is also preferable because it not only reduces the TD thermal shrinkage but also facilitates adjustment to the MD/TD thermal shrinkage ratio of the present invention. The temperature of the heating roll is preferably 60° C. or higher, particularly preferably 80° C. or higher. It is also preferably 150° C. or lower in view of keeping the transparency.

The physical properties used in the present invention were measured based on the following test methods.

(1) Viscosity Average Molecular Weight Mv

Based on ASTM-D4020, the limiting viscosity [η] was determined at 135° C. in a decalin solvent. The Mv of polyethylene was calculated using the following equation.

$$[\eta]=6.77\times 10^{-4} Mv^{0.67}$$

The Mv of polypropylene was calculated using the following equation.

$$[\eta]=1.10\times 10^{-4} Mv^{0.80}$$

(2) Film Thickness (μm)

The film thickness was measured at a room temperature of 23±2° C. using KBM (trade name), a micro thickness gage manufactured by Toyo Seiki Co. Ltd.

(3) Porosity (%)

A 10×10 cm sample was cut out of the microporous film and determined for the volume (cm$^3$) and mass (g) thereof, followed by calculating the porosity from them and the film density (g/cm$^3$) using the following equation.

Porosity=(Volume−Mass/Film density)/Volume×100

The film density was calculated from the density of the material used.

(4) Air Permeability (sec.)

A Gurley gas permeability tester (G-B2 (trade name) manufactured by Toyo Seiki Co. Ltd.) was used according to JIS P-8117. The time was measured which is required for 100 ml of air to be allowed to pass through an area of 645 mm² (diameter: 28.6 mm) using an inner cylinder weight of 567 g.

(5) Piercing Strength (N/μm)

Using KES-G5 (trade name), a handy compression tester manufactured by Kato Tech Co. Ltd., the microporous film was fixed on a sample holder having an aperture 11.3 mm in diameter. The central part of the fixed microporous film was then subjected to a piercing test at a needle tip curvature radius of 0.5 mm and a piercing speed of 2 mm/sec. in an atmosphere of 25° C., from which the piercing strength (N) was obtained as the maximum piercing load. The above strength (N) was multiplied by 1/film thickness (μm) to calculate the piercing strength (N/μm) in terms of a film thickness of 1 μm.

(6) Tensile Strength (MPa) and Tensile Elongation (%)

MD and TD samples (shape: 10 mm (width)×100 mm (length)) were measured using Autograph Model AG-A (trade name), a tensile testing machine manufactured by Shimadzu Corporation, according to JIS K7127. Under the condition of an inter-chuck distance of 50 mm, the sample was used by applying a cellophane tape (N. 29 (trade name), manufactured by Nitto Denko Packaging System Corporation) to one side of each end (25 mm) of the sample. In addition, to prevent the slipping of the sample during testing, a fluororubber having a thickness of 1 mm was attached to each inside of the chucks of the tensile testing machine.

The tensile elongation (%) was calculated by dividing the amount of elongation until breaking (mm) by the inter-chuck distance (50 mm) and then multiplying by 100. The tensile strength (MPa) was calculated by dividing the strength at breaking by the cross-sectional area of the sample before testing. In addition, the total (%) of the MD tensile elongation and the TD tensile elongation was calculated by summing the MD and TD values. In this regard, the measurement was carried out at a temperature of 23±2° C., a chuck pressure of 0.30 MPa and a tensile rate of 200 mm/min. (a strain rate of 400%/min. in case of a sample for which an inter-chuck distance of 50 mm could not be secured).

(7) Thermal Shrinkage at 65° C.

A separator is cut at a length of 150 mm in the MD direction and at a length of 200 mm in the TD direction and allowed to stand for 5 hours in an oven at 65° C. At this time, the sample is put between two sheets of paper so that it is not directly exposed to warm air. The sample is taken out of the oven, cooled, and measured for the length (mm) thereof, followed by calculating the MD and TD thermal shrinkages using the following equations. (In a case where the sample length could not be secured, a sample was used which was the longest possible in the range falling within 150 mm×200 mm.)

$$MD \text{ thermal shrinkage } (\%) = (150 - TD \text{ length after heating})/150 \times 100$$

$$TD \text{ thermal shrinkage } (\%) = (200 - TD \text{ length after heating})/200 \times 100$$

The MD/TD thermal shrinkage ratio was calculated according to the following equation.

$$MD/TD \text{ thermal shrinkage ratio} = \text{absolute value of } MD \text{ thermal shrinkage/absolute value of } TD \text{ thermal shrinkage}$$

(8) Thermal Shrinkage at 105° C.

A separator is cut at a length of 100 mm in the MD direction and at a length of 100 mm in the TD direction and allowed to stand for one hour in an oven at 105° C. At this time, the sample is put between two sheets of paper so that it is not directly exposed to warm air. The sample is taken out of the oven, cooled, and measured for the length (mm) thereof, followed by calculating MD and TD thermal shrinkages using the following equations.

$$MD \text{ thermal shrinkage } (\%) = (100 - MD \text{ length after heating})/100 \times 100$$

$$TD \text{ thermal shrinkage } (\%) = (100 - TD \text{ length after heating})/100 \times 100$$

The MD/TD thermal shrinkage ratio was calculated according to the following equation. (In a case where the sample length could not be secured, a sample was used which is the longest possible in the range falling within 100 mm×100 mm.)

$$MD/TD \text{ thermal shrinkage ratio} = \text{absolute value of } MD \text{ thermal shrinkage/absolute value of } TD \text{ thermal shrinkage}$$

(9) Battery Evaluation

Preparation of a positive electrode: In N-methylpyrrolidone (NMP) were dispersed 92.2% by weight of lithium-cobalt composite oxide (LiCoO$_2$) as an active material, 2.3% by weight each of scaly graphite and acetylene black as conductant agents and 3.2% by weight of polyvinylidene fluoride (PVDF) as a binder to prepare a slurry. The slurry was coated, using a dye coater, on one side of an aluminium foil 20 μm in thickness providing a positive-electrode collector, which was then dried at 130° C. for 3 minutes and pressed using a roll press. Here, the coating amount and bulk density of the active material in the positive electrode are set so as to be 250 μm² and 3.00 g/cm³, respectively. The resultant electrode was cut into a width of about 40 mm to make into a zonal shape.

Preparation of a negative electrode: In purified water were dispersed 96.6% by weight of artificial graphite as an active material and 1.4% by weight of an ammonium salt of carboxymethylcellulose and 1.7% by weight of a styrene-butadiene copolymer latex as binders to prepare a slurry. The slurry was coated, using a dye coater, on one side of a copper foil 12 μm in thickness providing a negative-electrode collector, which was then dried at 120° C. for 3 minutes and pressed using a roll press. Here, the coating amount and bulk density of the active material in the negative electrode are set so as to be 106 g/m² and 1.35 g/cm³, respectively. The resultant electrode was cut into a width of about 40 mm to make into a zonal shape.

Preparation of a nonaqueous electrolyte: A nonaqueous electrolyte was prepared by dissolving LiPF$_6$ as a solute in the mixed solvent of ethylene carbonate:ethylmethyl carbonate=1:2 (volume ratio) so as to provide a concentration of 1.0 mole/litter.

Battery assembly: The above microporous film separator, zonal positive electrode and zonal negative electrode were superposed in the order: zonal negative electrode/separator/zonal positive electrode/separator, which was then rolled several times in a scroll form until a desired thickness is provided to prepare an electrode plate laminate. The electrode plate laminate was pressed at 65° C. in a flat plate form and then housed in an aluminium container; an aluminium lead derived from a positive electrode collector was connected to the container wall, and a nickel lead derived from a negative electrode collector, to the container lid terminal.

(a) Here, the case where the electrode plate laminate could be smoothly housed in the aluminium container was determined as "good"; and the case where it was difficult to house the laminate therein was determined as "poor".

(b) Here, the case where, in none of 100 batteries, short-circuiting was detected with a voltage resistance checker was determined as "no short-circuit".

The container was subsequently dried at 65° C. under vacuum for 8 hours, and the above-described nonaqueous electrolyte was poured into the container, which was then sealed.

The lithium-ion battery thus prepared has a size of 6.3 mm long (thick), 30 mm wide and 48 mm high. After preparing the battery, a first battery charge was conducted for a total 6 hours by a method which involves charging the battery until a voltage of 4.2 V at a current value of (0.5 C) under the atmosphere of 25° C. and further starting to make the current value low, in which case 4.2 V was maintained.

(c) To subject the battery to an oven test, the charged battery was heated up from room temperature to 150° C. at 5° C./min. and allowed to stand at 150° C. for 10 minutes. The case where no firing occurred was determined as "good".

(d) To subject the battery to an impact test, it was dropped repeatedly ten times from a height of 1.9 m onto a concrete floor. The battery was then disassembled to observe the state of the separator. The case where no short-circuit occurred due to the deformation of the separator was determined as "good".

EXAMPLES

The present invention will be described based on Examples.

Example 1

Using a tumbler blender, 95 wt % of a polyethylene homopolymer having an Mv of 250,000 and 5 wt % of a polypropylene homopolymer having an Mv of 400,000 were dry-blended. To 99 wt % of the resultant pure blend was added 1 wt % of pentaerythrityl-tetrakis-[3-(3,5-di-t-butyl-4-hydroxyphenyl)propionate] as an antioxidant, which was again dry-blended using the tumbler blender to provide a blend comprising the polymers. The resultant blend comprising the polymers was purged with nitrogen and then fed to a twin screw extruder using a feeder in a nitrogen atmosphere. Liquid paraffin (kinematic viscosity at 37.78° C.: $7.59 \times 10^{-5}$ m$^2$/s) was injected into a cylinder of the extruder using a plunger pump.

The feeder and pump were adjusted so that the ratio of liquid paraffin in the whole blend melt-kneaded and extruded was 55 wt %. The melt kneading was carried out under conditions of a preset temperature of 200° C., a screw speed of 240 rpm and a discharge rate of 12 kg/h.

Subsequently, the melt kneaded material was extrusion-cast onto a cooling roll controlled at the surface temperature of 25° C. through a T-die for casting to provide a gel sheet having a thickness of 2,000 µm.

The gel sheet was then guided to a tenter-type simultaneous biaxial stretcher and biaxially drawn. The preset drawing conditions are a MD ratio of 7.0:1, a TD ratio of 6.4:1 and a preset temperature of 118° C.

Next, the sheet was guided to a methyl ethyl ketone tank and sufficiently immersed in methyl ethyl ketone to extract and remove liquid paraffin, followed by dry-removing methyl ethyl ketone.

Then, the sheet was guided to a TD tenter and subjected to heat fixation. The heat fixation temperature and TD relaxation rate were set to 125° C. and 0.80, respectively. Subsequently, the master roll rolled up in a length of 1,000 m was allowed to stand for 6 hours in a thermostatic chamber at 50° C. and then rolled back at a winding tension of 10 kg/m.

The physical properties of the resultant microporous film are shown in Table 1.

Evaluation of the battery showed good results in all items.

Example 2

Using a tumbler blender, 47.5 wt % of a polyethylene homopolymer having an Mv of 700,000, 47.5 wt % of a polyethylene homopolymer having an Mv of 250,000 and 5 wt % of a polypropylene homopolymer having an Mv of 400,000 were dry-blended. To 99 wt % of the resultant pure blend was added 1 wt % of pentaerythrityl-tetrakis-[3-(3,5-di-t-butyl-4-hydroxyphenyl)propionate] as an antioxidant, which was again dry-blended using the tumbler blender to provide a blend comprising the polymers. The resultant blend comprising the polymers was purged with nitrogen and then fed to a twin screw extruder using a feeder in a nitrogen atmosphere. Liquid paraffin (kinematic viscosity at 37.78° C.: $7.59 \times 10^{-5}$ m$^2$/s) was injected into a cylinder of the extruder using a plunger pump.

The feeder and pump were adjusted so that the ratio of liquid paraffin in the whole blend melt-kneaded and extruded was 65 wt %. The melt kneading was carried out under conditions of a preset temperature of 200° C., a screw speed of 240 rpm and a discharge rate of 12 kg/h.

Subsequently, the melt kneaded material was extrusion-cast onto a cooling roll controlled at the surface temperature of 25° C. through a T-die for casting to provide a gel sheet having a thickness of 1,300 µm.

The gel sheet was then guided to a tenter-type simultaneous biaxial stretcher and biaxially drawn. The preset drawing conditions are a MD ratio of 7.0:1, a TD ratio of 6.4:1 and a preset temperature of 120° C.

Next, the sheet was guided to a methyl ethyl ketone tank and sufficiently immersed in methyl ethyl ketone to extract and remove liquid paraffin, followed by dry-removing methyl ethyl ketone.

Then, the sheet was guided to a TD tenter and subjected to heat fixation. The heat fixation temperature and TD relaxation rate were set to 125° C. and 0.80, respectively. Subsequently, the master roll rolled up in a length of 1,000 m was allowed to stand for 6 hours in a thermostatic chamber at 50° C. and then rolled back at a winding tension of 10 kg/m.

The physical properties of the resultant microporous film are shown in Table 1.

Evaluation of the battery showed good results in all items.

Example 3

A microporous film was obtained in the same way as in Example 2 except for extruding the melt kneaded material onto the cooling roll, followed by casting using bank molding; setting the biaxial drawing temperature and heat fixation temperature to 118° C. and 122° C., respectively; and allowing the rolled-up master roll to stand for 6 hours in a thermostatic chamber at 60° C.

The physical properties of the resultant microporous film are shown in Table 1.

Evaluation of the battery showed good results in all items.

Example 4

Using a tumbler blender, 20 wt % of a polyethylene homopolymer having an Mv of 2,500,000, 15 wt % of a polyethylene homopolymer having an Mv of 700,000, 30 wt % of a polyethylene homopolymer having an Mv of 250,000 and 30 wt % of a ethylene-propylene copolymer having an Mv of 120,000 (comonomer: propylene, content: 0.6 mole %) were dry-blended. To 99 wt % of the resultant pure blend was added 1 wt % of pentaerythrityl-tetrakis-[3-(3,5-di-t-butyl-4-hydroxyphenyl)propionate] as an antioxidant, which was again dry-blended using the tumbler blender to provide a blend comprising the polymers. The resultant blend comprising the polymers was purged with nitrogen and then fed to a twin screw extruder using a feeder in a nitrogen atmosphere.

Liquid paraffin (kinematic viscosity at 37.78° C.: 7.59×10$^{-5}$ m$^2$/s) was injected into a cylinder of the extruder using a plunger pump.

The feeder and pump were adjusted so that the ratio of liquid paraffin in the whole blend melt-kneaded and extruded was 65 wt %. The melt kneading was carried out under conditions of a preset temperature of 200° C., a screw speed of 240 rpm and a discharge rate of 12 kg/h.

Subsequently, the melt kneaded material was extrusion-cast onto a cooling roll controlled at the surface temperature of 25° C. through a T-die for casting to provide a gel sheet having a thickness of 1,800 μm.

The gel sheet was then guided to a tenter-type simultaneous biaxial stretcher and biaxially drawn. The preset drawing conditions are a MD ratio of 7.0:1, a TD ratio of 6.4:1 and a preset temperature of 120° C.

Next, the sheet was guided to a methyl ethyl ketone tank and sufficiently immersed in methyl ethyl ketone to extract and remove liquid paraffin, followed by dry-removing methyl ethyl ketone.

Then, the sheet was guided to a TD tenter and subjected to heat fixation. The heat fixation temperature and TD relaxation rate were set to 120° C. and 0.75, respectively. Subsequently, the master roll rolled up in a length of 1,000 m was allowed to stand for 10 hours in a thermostatic chamber at 60° C. and then rolled back at a winding tension of 10 kg/m.

The physical properties of the resultant microporous film are shown in Table 1.

Evaluation of the battery showed good results in all items.

Example 5

Using a tumbler blender, 20 wt % of a polyethylene homopolymer having an Mv of 2,500,000, 15 wt % of a polyethylene homopolymer having an Mv of 700,000, 30 wt % of a polyethylene homopolymer having an Mv of 250,000 and 30 wt % of a ethylene-propylene copolymer having an Mv of 120,000 (comonomer: propylene, content: 0.6 mole %) were dry-blended. To 99 wt % of the resultant pure blend was added 1 wt % of pentaerythrityl-tetrakis-[3-(3,5-di-t-butyl-4-hydroxyphenyl)propionate] as an antioxidant, which was again dry-blended using the tumbler blender to provide a blend comprising the polymers. The resultant blend comprising the polymers was purged with nitrogen and then fed to a twin screw extruder using a feeder in a nitrogen atmosphere. Liquid paraffin (kinematic viscosity at 37.78° C.: 7.59×10$^{-5}$ m$^2$/s) was injected into a cylinder of the extruder using a plunger pump.

The feeder and pump were adjusted so that the ratio of liquid paraffin in the whole blend melt-kneaded and extruded was 65 wt %. The melt kneading was carried out under conditions of a preset temperature of 200° C., a screw speed of 240 rpm and a discharge rate of 12 kg/h.

Subsequently, the melt kneaded material was extrusion-cast onto a cooling roll controlled at the surface temperature of 25° C. through a T-die for casting to provide a gel sheet having a thickness of 800 μm.

The gel sheet was then guided to a tenter-type simultaneous biaxial stretcher and biaxially drawn. The preset drawing conditions are a MD ratio of 7.0:1, a TD ratio of 6.4:1 and a preset temperature of 118° C.

Next, the sheet was guided to a methyl ethyl ketone tank and sufficiently immersed in methyl ethyl ketone to extract and remove liquid paraffin, followed by dry-removing methyl ethyl ketone.

Then, the sheet was guided to a TD tenter and subjected to heat fixation. The heat fixation temperature and TD relaxation rate were set to 120° C. and 0.80, respectively. Subsequently, the master roll rolled up in a length of 1,000 m was allowed to stand for 10 hours in a thermostatic chamber at 60° C. and then rolled back at a winding tension of 8 kg/m.

The physical properties of the resultant microporous film are shown in Table 1.

Evaluation of the battery showed good results in all items.

Example 6

Using a tumbler blender, 20 wt % of a polyethylene homopolymer having an Mv of 2,500,000, 15 wt % of a polyethylene homopolymer having an Mv of 700,000, 30 wt % of a polyethylene homopolymer having an Mv of 250,000 and 30 wt % of a ethylene-propylene copolymer having an Mv of 120,000 (comonomer: propylene, content: 0.6 mole %) were dry-blended. To 99 wt % of the resultant pure blend was added 1 wt % of pentaerythrityl-tetrakis-[3-(3,5-di-t-butyl-4-hydroxyphenyl)propionate] as an antioxidant, which was again dry-blended using the tumbler blender to provide a blend comprising the polymers. The resultant blend comprising the polymers was purged with nitrogen and then fed to a twin screw extruder using a feeder in a nitrogen atmosphere. Liquid paraffin (kinematic viscosity at 37.78° C.: 7.59×10$^{-5}$ m$^2$/s) was injected into a cylinder of the extruder using a plunger pump.

The feeder and pump were adjusted so that the ratio of liquid paraffin in the whole blend melt-kneaded and extruded was 65 wt %. The melt kneading was carried out under conditions of a preset temperature of 200° C., a screw speed of 240 rpm and a discharge rate of 12 kg/h.

Subsequently, the melt kneaded material was extrusion-cast onto a cooling roll controlled at the surface temperature of 25° C. through a T-die for casting to provide a gel sheet having a thickness of 1,200 μm.

The gel sheet was then guided to a tenter-type simultaneous biaxial stretcher and biaxially drawn. The preset drawing conditions are a MD ratio of 7.0:1, a TD ratio of 6.4:1 and a preset temperature of 118° C.

Next, the sheet was guided to a methyl ethyl ketone tank and sufficiently immersed in methyl ethyl ketone to extract and remove liquid paraffin, followed by dry-removing methyl ethyl ketone.

Then, the sheet was guided to a TD tenter and subjected to heat fixation. The heat fixation temperature and TD relaxation rate were set to 115° C. and 0.80, respectively. Subsequently, the sheet was allowed to contact with a heating drum temperature-controlled at 100° C. for 5 seconds and rolled up.

The physical properties of the resultant microporous film are shown in Table 1.

Evaluation of the battery showed good results in all items.

Example 7

A microporous film was obtained in the same way as in Example 6 except for setting the cast sheet thickness, biaxial draw ratio and biaxial draw temperature to 950 μm, 7×4 and 117° C., respectively.

Evaluation of the battery showed good results in all items.

Comparative Example 1

A microporous film was obtained in the same way as in Example 2 except for setting the cast sheet thickness, biaxial draw ratio, biaxial draw temperature and TD relaxation rate during heat fixation to 800 μm, 5×5, 118° C. and 0.90, respectively. Evaluation of the battery did not show good results in the items other than that of short-circuiting.

Comparative Example 2

A microporous film was obtained in the same way as in Example 2 except for setting the biaxial draw temperature to 125° C. Evaluation of the battery did not show good results for "mountability as a battery roll" and "short-circuiting".

Comparative Example 3

A microporous film was obtained in the same way as in Example 2 except for not heat-treating or rolling back the master roll. Evaluation of the battery did not show a good result in the oven test.

Comparative Example 4

To 45 wt % of a PE having an Mv of 100,000 and a melting point of 135° C., 60 wt % of a PE having an Mv of 600,000 and a melting point of 135° C. and 15 wt % of a PE copolymer having an Mv of 120,000, a melting point of 131° C. and a propylene comonomer content of 1.3 mole % was added 1 wt % of pentaerythrityl-tetrakis-[3-(3,5-di-t-butyl-4-hydroxyphenyl)propionate] as an antioxidant, which was then dry-blended using a tumbler blender to provide a blend comprising the polymers. The resultant blend comprising the polymers was purged with nitrogen and then fed to a twin screw extruder using a feeder in a nitrogen atmosphere. Liquid paraffin (kinematic viscosity at 37.78° C.: $7.59 \times 10^{-5}$ m$^2$/s) was injected into a cylinder of the extruder using a plunger pump.

The feeder and pump were adjusted so that the ratio of liquid paraffin in the whole blend melt-kneaded and extruded was 68 wt %. The melt kneading was carried out under conditions of a preset temperature of 240° C., a screw speed of 120 rpm and a discharge rate of 12 kg/h.

Subsequently, the melt kneaded material was extrusion-cast onto a cooling roll controlled at the surface temperature of 25° C. through a T-die for casting to provide a gel sheet having a thickness of 1,400 μm.

The gel sheet was then guided to a tenter-type simultaneous biaxial stretcher and biaxially drawn. The preset drawing conditions are a MD ratio of 7.0:1, a TD ratio of 6.8:1 and a preset temperature of 123° C. Next, the sheet was guided to a methyl ethyl ketone tank and sufficiently immersed in methyl ethyl ketone to extract and remove liquid paraffin, followed by dry-removing methyl ethyl ketone. Then, the sheet was guided to a TD tenter and subjected to heat fixation. The heat fixation temperature and TD relaxation rate were set to 125° C. and 0.80, respectively.

Evaluation of the battery did not show good results for mountability as a battery roll and the oven test.

Comparative Example 5

To 50 wt % of a PE homopolymer having an Mv of 300,000 and an Mw/Mn of 7 and 50 wt % of a PE homopolymer having an Mv of 1,000,000 and an Mw/Mn of 7 was added 1 wt % of pentaerythrityl-tetrakis-[3-(3,5-di-t-butyl-4-hydroxyphenyl)propionate] as an antioxidant, which was then dry-blended using a tumbler blender to provide a blend comprising the polymers. The resultant blend comprising the polymers was purged with nitrogen and then fed to a twin screw extruder using a feeder in a nitrogen atmosphere. Liquid paraffin (kinematic viscosity at 37.78° C.: $7.59 \times 10^{-5}$ m$^2$/s) was injected into a cylinder of the extruder using a plunger pump.

The feeder and pump were adjusted so that the ratio of liquid paraffin in the whole blend melt-kneaded and extruded was 65 wt %. The melt kneading was carried out under conditions of a preset temperature of 250° C., a screw speed of 200 rpm and a discharge rate of 15 kg/h.

Subsequently, the melt kneaded material was extrusion-cast onto a cooling roll controlled at the surface temperature of 30° C. through a T-die for casting to provide a gel sheet having a thickness of 1,600 μm.

The gel sheet was then guided to a tenter-type simultaneous biaxial stretcher and biaxially drawn. The preset drawing conditions are a MD ratio of 7.0:1, a TD ratio of 7.0:1 and a preset temperature of 119° C.

Next, the sheet was guided to a methyl ethyl ketone tank and sufficiently immersed in methyl ethyl ketone to extract and remove liquid paraffin, followed by dry-removing methyl ethyl ketone.

Then, the sheet was guided to a TD tenter and subjected to heat fixation. The heat fixation temperature and TD relaxation rate were set to 125 to 130° C. and 0.83, respectively.

Evaluation of the battery did not show good results for mountability as a battery roll and the oven test.

Comparative Example 6

To 30 wt % of a PE having an Mv of 2,000,000 and 70 wt % of a high density PE having an Mv of 300,000 was added 1 wt % of pentaerythrityl-tetrakis-[3-(3,5-di-t-butyl-4-hydroxyphenyl)propionate] as an antioxidant, which was then dry-blended using a tumbler blender to provide a blend comprising the polymers. The resultant blend comprising the polymers was purged with nitrogen and then fed to a twin screw extruder using a feeder in a nitrogen atmosphere. Liquid paraffin (kinematic viscosity at 37.78° C.: $7.59 \times 10^{-5}$ m$^2$/s) was injected into a cylinder of the extruder using a plunger pump.

The feeder and pump were adjusted so that the ratio of liquid paraffin in the whole blend melt-kneaded and extruded was 80 wt %. The melt kneading was carried out under conditions of a preset temperature of 200° C., a screw speed of 200 rpm and a discharge rate of 12 kg/h.

Subsequently, the melt kneaded material was extrusion-cast onto a cooling roll controlled at the surface temperature of 30° C. through a T-die for casting to provide a gel sheet having a thickness of 1,800 μm.

The gel sheet was then guided to a tenter-type simultaneous biaxial stretcher and biaxially drawn. The preset drawing conditions are a MD ratio of 7.0:1, a TD ratio of 7.0:1 and a preset temperature of 105° C.

Next, the sheet was guided to a methyl ethyl ketone tank and sufficiently immersed in methyl ethyl ketone to extract and remove liquid paraffin, followed by dry-removing methyl ethyl ketone.

The resultant film was then drawn by a factor of 1.4 in the MD direction at 115° C. using a roll drawing machine. Next, the film was guided to a TD tenter and drawn a factor of 2.0 in the TD direction at 115° C. Subsequently, the film was relaxation-treated at 110° C. for 10 seconds using a tenter so as to provide sizes of 95% each of the preceding sizes in the MD and TD directions, and further subjected to heat fixation treatment at 120° C. for 15 minutes employing the tenter.

Evaluation of the battery did not show good results for mountability as a battery roll and the oven test characteristics.

Comparative Example 7

A microporous film was similarly obtained using a commercial microporous film obtained by the pore-forming process by stretching, which is a laminate between a polyethylene and a polypropylene.

Evaluation of the battery did not show good results in the items of "short-circuit" and "impact test".

TABLE 1

|  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Film Thickness (μm) | 16 | 16 | 16 | 20 | 20 | 10 | 20 |
| Porosity (%) | 46 | 46 | 50 | 41 | 35 | 45 | 43 |
| Air Permeability (second) | 200 | 200 | 110 | 430 | 800 | 270 | 450 |
| Piercing Strength (N) | 4.4 | 2.3 | 4.4 | 4.8 | 9.0 | 6.3 | 3.1 |
| Piercing Strength in Terms of Film Thickness of 1 μm (N/μ) | 0.28 | 0.14 | 0.28 | 0.25 | 0.46 | 0.64 | 0.17 |
| MD Tensile Strength (MPa) | 90 | 70 | 110 | 130 | 270 | 340 | 200 |
| TD Tensile Strength (MPa) | 95 | 45 | 90 | 90 | 210 | 310 | 15 |
| MD Elongation (%) | 160 | 60 | 40 | 50 | 60 | 40 | 50 |
| TD Elongation (%) | 210 | 110 | 95 | 90 | 70 | 50 | 700 |
| Sum of MD and TD Elongations | 370 | 170 | 135 | 140 | 130 | 90 | 750 |
| MD Thermal Shrinkage (65° C./5 h) | 1.4 | 0.4 | 3.6 | 2.3 | 3.9 | 0.5 | 1.5 |
| TD Thermal Shrinkage (65° C./5 h) | 0.9 | 0.2 | 1.3 | 1.2 | 2.1 | 0.6 | 0.1 |
| MD/TD Thermal Shrinkage Ratio | 1.6 | 2.0 | 2.8 | 1.9 | 1.9 | 0.8 | 15.0 |
| MD Thermal Shrinkage (105° C./1 h) | 7.0 | 3.0 | 12.0 | 9.0 | 8.0 | 2.2 | 3.0 |
| TD Thermal Shrinkage (105° C./1 h) | 5.7 | 2.3 | 6.0 | 7.0 | 5.0 | 2.7 | 0.1 |
| MD/TD Thermal Shrinkage Ratio | 1.2 | 1.3 | 2.0 | 1.3 | 1.6 | 0.8 | 30.0 |
| Mountability as battery roll*[1] | Poor | Poor | Good | Poor | Poor | Poor | Fair |
| Short-circuit*[2] | Not Found | Found | Not Found | Not Found | Not Found | Not Found | Found |
| Oven Test*[3] | Poor | Good | Poor | Poor | Poor | Poor | Good |
| Impact Test*[4] | Poor | Good | Good | Good | Excellent | Good | Poor |

*[1]The case where a rolled battery could be particularly smoothly inserted into an aluminium can was determined as "excellent"; the case where the battery could be inserted without problems, as "good"; and the case where it could not be inserted, as "poor".
*[2]The case where, for 100 batteries, no short-circuiting was detected with a voltage resistance checker was determined as "not found".
*[3]"No firing" was determined as "good".
*[4]The case where the battery disassembled after the test had no short-circuit due to the deformation of the separator was determined as "good". Particularly, the case where the separator had little deformation was determined as "excellent".

TABLE 2

|  | Ex. 1 | Ex. 2 | Ex. 3 | Ex. 4 | Ex. 5 | Ex. 6 | Ex. 7 |
|---|---|---|---|---|---|---|---|
| Film Thickness (μm) | 25 | 16 | 16 | 20 | 7 | 16 | 18 |
| Porosity (%) | 47 | 46 | 48 | 47 | 48 | 53 | 52 |
| Air Permeability (second) | 220 | 200 | 150 | 250 | 110 | 90 | 100 |
| Piercing Strength (N) | 4.9 | 4.1 | 4.9 | 5.9 | 3.4 | 3.4 | 3.6 |
| Piercing Strength in Terms of Film Thickness of 1 μm (N/μ) | 0.20 | 0.26 | 0.31 | 0.30 | 0.50 | 0.22 | 0.21 |
| MD Tensile Strength (MPa) | 120 | 140 | 160 | 150 | 200 | 90 | 140 |
| TD Tensile Strength (MPa) | 100 | 65 | 70 | 130 | 160 | 70 | 60 |
| MD Elongation (%) | 60 | 45 | 30 | 60 | 60 | 50 | 40 |
| TD Elongation (%) | 70 | 95 | 90 | 90 | 100 | 100 | 110 |
| Sum of MD and TD Elongations | 130 | 140 | 120 | 150 | 160 | 150 | 150 |
| MD Thermal Shrinkage (65° C./5 h) | 1.8 | 2.7 | 3.2 | 3.0 | 4.0 | 4.5 | 5.1 |
| TD Thermal Shrinkage (65° C./5 h) | 0.7 | 0.7 | 0.7 | 0.8 | 0.8 | 0.9 | 0.8 |
| MD/TD Thermal Shrinkage Ratio | 2.6 | 3.9 | 4.6 | 3.8 | 5.0 | 5.0 | 6.4 |
| MD Thermal Shrinkage (105° C./1 h) | 3.0 | 9.5 | 13.0 | 12.5 | 14.5 | 13.2 | 15.0 |
| TD Thermal Shrinkage (105° C./1 h) | 1.1 | 4.7 | 5.0 | 5.5 | 6.5 | 5.0 | 4.2 |
| MD/TD Thermal Shrinkage Ratio | 2.7 | 2.0 | 2.6 | 2.3 | 2.2 | 2.6 | 3.6 |
| Mountability as battery roll*[1] | Good | Good | Excellent | Good | Excellent | Excellent | Excellent |
| Short-circuit*[2] | Not Found | Not Found | Not Found | Not Found | Not Found | Not Found | Not Found |
| Oven Test*[3] | Good | Good | Excellent | Good | Good | Excellent | Excellent |
| Impact Test*[4] | Excellent | Good | Excellent | Excellent | Good | Good | Good |

*[1]The case where a rolled battery could be particularly smoothly inserted into an aluminium can was determined as "excellent"; the case where the battery could be inserted without problems, as "good"; and the case where it could not be inserted, as "poor".
*[2]The case where, for 100 batteries, no short-circuiting was detected with a voltage resistance checker was determined as "not found".
*[3]"No firing" was determined as "good".
*[4]The case where the battery disassembled after the test had no short-circuit due to the deformation of the separator was determined as "good". Particularly, the case where the separator had little deformation was determined as "excellent".

INDUSTRIAL APPLICABILITY

The present invention relates to a microporous film widely used as a separation membrane for separation or selective permeation of substances, or the like, and as a separator material or the like. Particularly, the microporous film is suitably used as a separator for lithium-ion batteries or the like.

TABLE 1

|  | Ex. 1 | Ex. 2 | Ex. 3 | Ex. 4 | Ex. 5 | Ex. 6 | Ex. 7 |
|---|---|---|---|---|---|---|---|
| Film Thickness (μm) | 25 | 16 | 16 | 20 | 7 | 16 | 18 |
| Porosity (%) | 47 | 46 | 48 | 47 | 48 | 53 | 52 |
| Air Permeability (second) | 220 | 200 | 150 | 250 | 110 | 90 | 100 |
| Piercing Strength (N) | 4.9 | 4.1 | 4.9 | 5.9 | 3.4 | 3.4 | 3.6 |
| Piercing Strength in Terms of Film Thickness of 1 μm (N/μ) | 0.20 | 0.26 | 0.31 | 0.30 | 0.50 | 0.22 | 0.21 |

TABLE 1-continued

|  | Ex. 1 | Ex. 2 | Ex. 3 | Ex. 4 | Ex. 5 | Ex. 6 | Ex. 7 |
|---|---|---|---|---|---|---|---|
| MD Tensile Strength (MPa) | 120 | 140 | 160 | 150 | 200 | 90 | 140 |
| TD Tensile Strength (MPa) | 100 | 65 | 70 | 130 | 160 | 70 | 60 |
| MD Elongation (%) | 60 | 45 | 30 | 60 | 60 | 50 | 40 |
| TD Elongation (%) | 70 | 95 | 90 | 90 | 100 | 100 | 110 |
| Sum of MD and TD Elongations | 130 | 140 | 120 | 150 | 160 | 150 | 150 |
| MD Thermal Shrinkage (65° C./5 h) | 1.8 | 2.7 | 3.2 | 3.0 | 4.0 | 4.5 | 5.1 |
| TD Thermal Shrinkage (65° C./5 h) | 0.7 | 0.7 | 0.7 | 0.8 | 0.8 | 0.9 | 0.8 |
| MD/TD Thermal Shrinkage Ratio | 2.6 | 3.9 | 4.6 | 3.8 | 5.0 | 5.0 | 6.4 |
| MD Thermal Shrinkage (105° C./1 h) | 3.0 | 9.5 | 13.0 | 12.5 | 14.5 | 13.2 | 15.0 |
| TD Thermal Shrinkage (105° C./1 h) | 1.1 | 4.7 | 5.0 | 5.5 | 6.5 | 5.0 | 4.2 |
| MD/TD Thermal Shrinkage Ratio | 2.7 | 2.0 | 2.6 | 2.3 | 2.2 | 2.6 | 3.6 |
| Mountability as battery roll*[1] | Good | Good | Excellent | Good | Excellent | Excellent | Excellent |
| Short-circuit*[2] | Not Found | Not Found | Not Found | Not Found | Not Found | Not Found | Not Found |
| Oven Test*[3] | Good | Good | Excellent | Good | Good | Excellent | Excellent |
| Impact Test*[4] | Excellent | Good | Excellent | Excellent | Good | Good | Good |

*[1] The case where a rolled battery could be particularly smoothly inserted into an aluminium can was determined as "excellent"; the case where the battery could be inserted without problems, as "good"; and the case where it could not be inserted, as "poor".
*[2] The case where, for 100 batteries, no short-circuiting was detected with a voltage resistance checker was determined as "not found".
*[3] "No firing" was determined as "good".
*[4] The case where the battery disassembled after the test had no short-circuit due to the deformation of the separator was determined as "good". Particularly, the case where the separator had little deformation was determined as "excellent".

TABLE 2

|  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Film Thickness (μm) | 16 | 16 | 16 | 20 | 20 | 10 | 20 |
| Porosity (%) | 46 | 46 | 50 | 41 | 35 | 45 | 43 |
| Air Permeability (second) | 200 | 200 | 110 | 430 | 800 | 270 | 450 |
| Piercing Strength (N) | 4.4 | 2.3 | 4.4 | 4.8 | 9.0 | 6.3 | 3.1 |
| Piercing Strength in Terms of Film Thickness of 1 μm (N/μ) | 0.28 | 0.14 | 0.28 | 0.25 | 0.46 | 0.64 | 0.17 |
| MD Tensile Strength (MPa) | 90 | 70 | 110 | 130 | 270 | 340 | 200 |
| TD Tensile Strength (MPa) | 95 | 45 | 90 | 90 | 210 | 310 | 15 |
| MD Elongation (%) | 160 | 60 | 40 | 50 | 60 | 40 | 50 |
| TD Elongation (%) | 210 | 110 | 95 | 90 | 70 | 50 | 700 |
| Sum of MD and TD Elongations | 370 | 170 | 135 | 140 | 130 | 90 | 750 |
| MD Thermal Shrinkage (65° C./5 h) | 1.4 | 0.4 | 3.6 | 2.3 | 3.9 | 0.5 | 1.5 |
| TD Thermal Shrinkage (65° C./5 h) | 0.9 | 0.2 | 1.3 | 1.2 | 2.1 | 0.6 | 0.1 |
| MD/TD Thermal Shrinkage Ratio | 1.6 | 2.0 | 2.8 | 1.9 | 1.9 | 0.8 | 15.0 |
| MD Thermal Shrinkage (105° C./1 h) | 7.0 | 3.0 | 12.0 | 9.0 | 8.0 | 2.2 | 3.0 |
| TD Thermal Shrinkage (105° C./1 h) | 5.7 | 2.3 | 6.0 | 7.0 | 5.0 | 2.7 | 0.1 |
| MD/TD Thermal Shrinkage Ratio | 1.2 | 1.3 | 2.0 | 1.3 | 1.6 | 0.8 | 30.0 |
| Mountability as battery roll*[1] | Poor | Poor | Good | Poor | Poor | Poor | Fair |
| Short-circuit*[2] | Not Found | Found | Not Found | Not Found | Not Found | Not Found | Found |
| Oven Test*[3] | Poor | Good | Poor | Poor | Poor | Poor | Good |
| Impact Test*[4] | Poor | Good | Good | Good | Excellent | Good | Poor |

*[1] The case where a rolled battery could be particularly smoothly inserted into an aluminium can was determined as "excellent"; the case where the battery could be inserted without problems, as "good"; and the case where it could not be inserted, as "poor".
*[2] The case where, for 100 batteries, no short-circuiting was detected with a voltage resistance checker was determined as "not found".
*[3] "No firing" was determined as "good".
*[4] The case where the battery disassembled after the test had no short-circuit due to the deformation of the separator was determined as "good". Particularly, the case where the separator had little deformation was determined as "excellent".

The invention claimed is:

1. A microporous polyolefin film having a thickness of 1 μm (inclusive) to 50 μm (inclusive), a porosity of 30% (inclusive) to 70% (inclusive), a piercing strength of 0.15 N/μm or more in terms of a film thickness of 1 μm, tensile strengths in the length direction (MD tensile strength) and the width direction (TD tensile strength) of 30 MPa or more each, a thermal shrinkage in the width direction (TD thermal shrinkage) of 1% or less at 65° C., and a thermal shrinkage ratio in the length to width direction (MD/TD thermal shrinkage ratio) of more than 2 at 65° C., wherein tensile elongations in the length direction (MD tensile elongation) and the width direction (TD tensile elongation) are each 10% (inclusive) to 200% (inclusive); and the total of the MD tensile elongation and TD tensile elongation is 20% (inclusive) to 250% (inclusive).

2. The microporous polyolefin film according to claim 1, wherein the MD/TD thermal shrinkage ratio at 65° C. is more than 2.5.

3. The microporous polyolefin film according to claim 1 or 2, wherein the microporous film has an MD thermal shrinkage of more than 5% at 105° C.

4. The microporous polyolefin film according to claim 1 or 2, wherein the piercing strength is 3 N or more.

5. The microporous polyolefin film according to claim 1 or 2, wherein the microporous film is obtained from a composition comprising a polyolefin resin and a plasticizer.

6. The microporous polyolefin film according to claim 5, wherein the microporous film has an MD thermal shrinkage of more than 5% at 105° C. and the piercing strength is 3N or more.

* * * * *